United States Patent
Sakamoto et al.

(10) Patent No.: US 9,830,518 B2
(45) Date of Patent: Nov. 28, 2017

(54) LANE MARK RECOGNITION DEVICE (71) Applicant: HONDA MOTOR CO., LTD., Minato-Ku, Tokyo (JP)

(72) Inventors: Yosuke Sakamoto, Tochigi-Ken (JP); Kentaro Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 14/424,209

(22) PCT Filed: May 9, 2013

(86) PCT No.: PCT/JP2013/063008
§ 371 (c)(1),
(2) Date: Feb. 26, 2015

(87) PCT Pub. No.: WO2014/034187
PCT Pub. Date: Mar. 6, 2014

(65) Prior Publication Data
US 2015/0310282 A1    Oct. 29, 2015

(30) Foreign Application Priority Data

Aug. 30, 2012  (JP) ................. 2012-190437

(51) Int. Cl.
*G06K 9/00*   (2006.01)
*G08G 1/16*   (2006.01)
(Continued)

(52) U.S. Cl.
CPC ....... *G06K 9/00798* (2013.01); *G06K 9/4604* (2013.01); *G06K 9/4661* (2013.01);
(Continued)

(58) Field of Classification Search
CPC ..... G06K 9/00798; G06T 2207/30256; B60W 2520/14
See application file for complete search history.

(56) References Cited

U.S. PATENT DOCUMENTS 5,359,666 A      10/1994  Nakayama et al.
6,819,779 B1 *   11/2004  Nichani ............. G06K 9/00798
                                                      382/104
(Continued)

FOREIGN PATENT DOCUMENTS

JP    H06-24035 B2    3/1994
JP    11-147473 A     6/1999
(Continued)

OTHER PUBLICATIONS

Huang et al., "On-Board Vision System for Lane Recognition and Front-Vehicle Detection to Enhance Driver's Awareness," Proceedings of the 2004 IEEE International Conference on Robotics and Automation, New Orleans, Louisiana, USA, Apr. 2004, published on May 1, 2004, pp. 2456-2460, vol. 3.

(Continued)

*Primary Examiner* — Brian P Werner
*Assistant Examiner* — Ian Lemieux
(74) *Attorney, Agent, or Firm* — Carrier Blackman & Associates, P.C.; Joseph P. Carrier; Jeffrey T. Gedeon (57) ABSTRACT A lane mark recognition device detects an edge located in a proximal area in front of the vehicle, and determines a lane mark candidate on the basis of the detected edge and an edge that is located in a distal area farther than the proximal area in front of the vehicle and that is continuous with the edge. Therefore, an edge of another vehicle (leading vehicle) or the like located in the distal area in a captured image is not detected as a lane mark candidate (is excluded as a non lane mark candidate).

6 Claims, 6 Drawing Sheets

(51) Int. Cl.
*G06K 9/46* (2006.01)
*G06K 9/52* (2006.01)
*G06T 7/73* (2017.01)

(52) U.S. Cl.
CPC .............. *G06K 9/52* (2013.01); *G06T 7/73* (2017.01); *G08G 1/167* (2013.01); *G06T 2207/20061* (2013.01); *G06T 2207/30256* (2013.01)

(56) References Cited

U.S. PATENT DOCUMENTS

| | | | |
|---|---|---|---|
| 6,829,388 B1 | 12/2004 | Sakurai | |
| 7,209,832 B2 * | 4/2007 | Yamamoto | G06K 9/00798 382/103 |
| 7,831,367 B2 * | 11/2010 | Heinrichs-Bartscher | B60W 30/16 342/70 |
| 9,436,878 B2 * | 9/2016 | Sakamoto | B62D 15/025 |
| 9,489,585 B2 * | 11/2016 | Sakamoto | G06K 9/00798 |
| 2006/0239509 A1 * | 10/2006 | Saito | G06K 9/6205 382/104 |
| 2007/0154068 A1 * | 7/2007 | Stein | G01C 3/22 382/106 |
| 2009/0167864 A1 * | 7/2009 | Unoura | G06K 9/00798 348/148 |
| 2009/0174577 A1 * | 7/2009 | Nakamura | G06K 9/00798 340/995.1 |
| 2011/0200258 A1 * | 8/2011 | Suzuki | G06K 9/00798 382/199 |
| 2011/0238252 A1 | 9/2011 | Takeda et al. | |
| 2012/0072080 A1 * | 3/2012 | Jeromin | B60Q 1/143 701/49 |
| 2015/0294160 A1 * | 10/2015 | Takahashi | G06K 9/00791 382/104 |
| 2015/0294163 A1 * | 10/2015 | Sakamoto | G06K 9/00798 382/103 |

FOREIGN PATENT DOCUMENTS

| | | |
|---|---|---|
| JP | 2001-076147 A | 3/2001 |
| JP | 2003-067752 A | 3/2003 |
| JP | 2011-221983 A | 11/2011 |
| JP | 2012-014398 A | 1/2012 |

OTHER PUBLICATIONS

Office Action with Search Report dated Jul. 6, 2016 issued over the corresponding Chinese Patent Application No. 201380042458.7 with the English translation of pertinent portion.

Huang et al., "On-Board Vision System for Lane Recognition and Front-Vehicle Detection to Enhance Driver's Awareness," Proceedings of the 2004 IEEE International Conference on Robotics and Automation, New Orleans, Louisiana, USA, Apr. 2004, published on May 1, 2004, pp. 2456-2461, vol. 3.

\* cited by examiner

LANE MARK RECOGNITION DEVICE

TECHNICAL FIELD

The present invention relates to a lane mark recognizing apparatus (lane mark recognition device) for recognizing lane marks such as white lines or the like, which are provided on a driving road in front of a vehicle.

BACKGROUND ART

A technique has been proposed for recognizing the positions of left and right white lines on a driving road from an image captured in front of a vehicle by a camera that is mounted on the vehicle (see paragraph [0014] of Japanese Laid-Open Patent Publication No. 11-147473, hereinafter referred to as "JP11-147473A"). According to the technique disclosed in JP11-147473A, in which attention is paid to the fact that the white lines are higher in terms of lightness (brightness) than other portions of the road surface, an image in a range from about 5 [m] to 30 [m] in front of the vehicle is differentiated laterally (horizontally) in order to produce an edge image represented by differential data. In addition, a combination of intervals, at which a differential value corresponding to a change in brightness goes from a positive level to a negative level and in which the intervals fall within a range that makes the intervals acceptable as white lines, is extracted as horizontal data of white line candidates (see paragraphs [0019] through [0021] of JP11-147473A).

Furthermore, a vertical continuity of the white line candidates, as represented by the horizontal data, is verified in the edge image successively from a lower end of the screen, thereby recognizing white lines (see paragraphs [0023] and [0024] of JP11-147473A).

SUMMARY OF THE INVENTION

In order to recognize white lines or the like, which extend continuously upward from a lower end of the screen, as a straight line, a known type of straight line recognizing process, such as a Hough transform or the like, is applied to the edge image.

The edge image, which is generated by differentiating the captured image, includes edges of other vehicles or the like that are driving in front of the vehicle (the driver's own vehicle), i.e., edges other than the white lines.

The straight line recognizing process, which is based on a Hough transform, is a process for extracting a gradient and an intercept of a line segment from a noise-added image. However, such a process does not serve as a process for detecting the length of the line segment.

Thus, the straight line recognizing process, which is based on a Hough transform, is capable of recognizing an edge of a true white line candidate (continuous line candidate), which extends continuously upward from a lower end of the screen, as a straight line. However, such a straight line recognizing process is disadvantageous, in that the edge of another vehicle (preceding vehicle) or the like, which remains in an upper portion of the screen, is detected erroneously as a white line candidate (continuous line candidate). Thus, a problem occurs in that the other vehicle is recognized erroneously as a white line.

The present invention has been made in view of the aforementioned problems. An object of the present invention is to provide a lane mark recognizing apparatus, which prevents an edge of another vehicle (preceding vehicle) or the like, which is not a lane mark, from being detected erroneously as a lane mark candidate.

According to the present invention, a lane mark recognizing apparatus is provided, comprising a vehicle-mounted image capturing unit that captures an image including a driving road in front of the vehicle, an edge extractor that executes an edge extracting process on the image captured by the image capturing unit, a lane mark recognizer that recognizes lane marks based on edges extracted by the edge extractor, and a lane mark candidate determiner that detects edges, which exist within a short-distance area in front of the vehicle, from among the edges extracted by the edge extractor, and determines lane mark candidates based on the detected edges together with edges that exist in a long-distance area located in front of the vehicle farther than the short-distance area and which are contiguous to the detected edges, wherein the lane mark recognizer executes a lane mark recognizing process on the lane mark candidates determined by the lane mark candidate determiner.

According to the present invention, edges that exist within the short-distance area in front of the vehicle are detected, and lane mark candidates are determined based on the detected edges together with edges that exist within the long-distance area in front of the vehicle farther than the short-distance area and which are contiguous to the detected edges in the short-distance area. Therefore, an edge represented by another vehicle (preceding vehicle) or the like, which remains within the long-distance area in the captured image, is prevented from being recognized erroneously as a lane mark candidate, i.e., is regarded as a non-lane mark candidate and is excluded. As a result, edges of other vehicles (preceding vehicles) or the like are not recognized erroneously as lane mark candidates.

The lane mark candidate determiner may detect, as the edges that exist within the short-distance area, edges that approach the vehicle in each of prescribed times and enter into the short-distance area from the long-distance area in front of the vehicle.

If the edges are detected at least once in the short-distance area in front of the vehicle in a plurality of successive images that are captured by the image capturing unit, the lane mark candidate determiner may detect the detected edges as the edges that exist within the short-distance area.

The vehicle may include a yaw rate sensor for the vehicle and/or a steering angle sensor for a steering wheel, and an area in front of the vehicle may be determined based on output signals from the yaw rate sensor and/or the steering angle sensor.

The lane mark candidate determiner preferably is arranged such that, as the vehicle speed of the vehicle becomes higher, an image range within the short-distance area in a forward direction of the vehicle is set shorter.

In each of the above features of the present invention, an edge, which exists within the long-distance area in front of the vehicle and remains within the long-distance area after a prescribed time, may be excluded so as not to be handled as a lane mark candidate. In this manner, it is possible to increase accuracy and to avoid erroneously detecting the edge of another vehicle (preceding vehicle), the relative speed of which is close to the vehicle, as a lane mark candidate.

According to the present invention, edges that have not entered into the short-distance area in front of the vehicle, i.e., edges that remain within the long-distance area, can be excluded from the lane mark candidates. Therefore, the edge of another vehicle (preceding vehicle) or the like, which remains within the long-distance area, is prevented from being erroneously recognized as a lane mark candidate, i.e., is regarded as a non-lane mark candidate and is excluded. As a result, other vehicles (preceding vehicles) or the like are not recognized erroneously as lane marks.

DESCRIPTION OF EMBODIMENTS

An embodiment of the present invention will be described in detail below with reference to the accompanying drawings.

Figure 1:
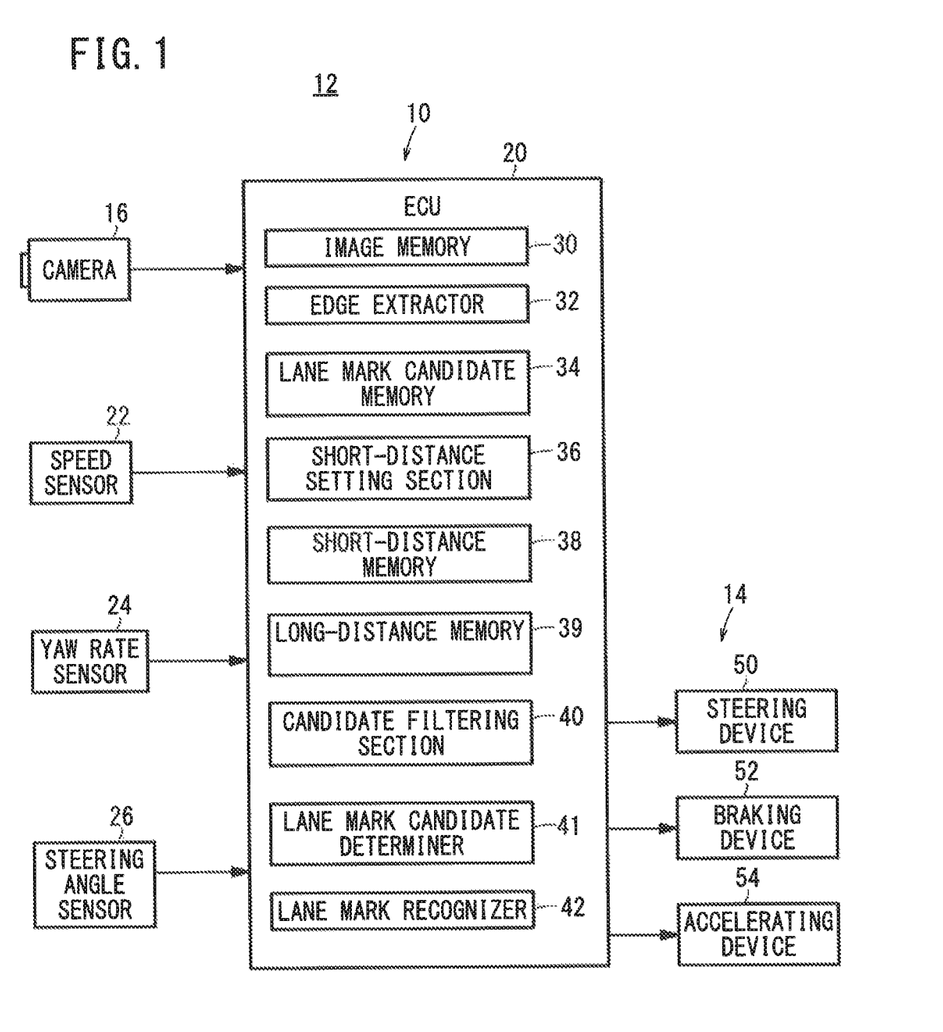
FIG. 1 is a block diagram of a vehicle incorporating a lane mark recognizing apparatus according to an embodiment of the present invention.

FIG. 1 shows a general configuration of a vehicle 12 in which a lane mark recognizing apparatus 10 according to an embodiment of the present invention is incorporated.

The lane mark recognizing apparatus 10 is configured as a portion of the functions of a drive assisting apparatus 14, which is incorporated in the vehicle 12, for assisting the driver of the vehicle 12 in steering and braking the vehicle 12 as the vehicle is driven along lane marks on a driving road.

The term "lane marks" refers to marks indicating lane boundaries, and includes continuous lines (also referred to as quasi-continuous lines) made up of broken white lines (line segments) disposed at spaced intervals, continuous lines made up of solid white lines, and successive marks such as Botts' dots, cat's eyes, or the like (which may also be considered as quasi-continuous lines).

The lane mark recognizing apparatus 10 according to the present embodiment basically includes a camera (image capturing unit) 16 for capturing images of a region in front of the vehicle 12, and an electronic control unit (ECU) 20 for recognizing lane marks from within an image that is captured by the camera 16.

The camera 16 is mounted on an upper portion of the front windshield of the vehicle 12, and captures an image including the driving road in front of the vehicle 12 through the front windshield. More specifically, the camera 16 comprises a digital camera, for example, and captures several tens of images (e.g., 30 frames) per second. On the camera 16, there is defined an actual-space coordinate system, the origin of which is located at the mount of the camera 16. The X-axis of the actual-space coordinate system extends along a widthwise direction (horizontal direction) of the vehicle 12, the Y-axis thereof extends along a vehicle-axis direction (the direction in which the vehicle 12 is driven, i.e., a forward direction), and the Z-axis thereof extends along a heightwise direction (vertical direction) of the vehicle 12.

The lane mark recognizing apparatus 10 also includes, apart from the camera 16 and the ECU 20, a speed sensor 22, a yaw rate sensor 24, and a steering angle sensor 26.

The speed sensor 22 outputs a speed signal representing the vehicle speed [m/s] of the vehicle 12. The yaw rate sensor 24 outputs, as a yaw rate [deg/s], a rotational speed signal representing a change in the rotational angle of the vehicle 12 in the direction of a turn.

The steering angle sensor 26 outputs a steering angle signal representing a steering angle [deg] of a steering device of the vehicle 12.

The ECU 20 calculates, from the output signal from the yaw rate sensor 24 or the steering angle sensor 26, a direction of travel of the vehicle 12, i.e., a tilt or a steering angle toward an X-axis direction on an XY plane, the X-axis of which extends along a widthwise direction of the vehicle 12, and the Y-axis of which extends along a direction in front of the vehicle 12 at 0 [deg] (reference).

The ECU 20 comprises a computer such as a microcomputer or the like, and includes a central processing unit (CPU), a read only memory (a ROM including an EEPROM) and a random access memory (RAM) that serve as memories, input and output devices such as an A/D converter, a D/A converter, etc., and a timer that serves as a timing unit. The ECU 20 functions as various function performing sections (function performing means) when the CPU reads and executes programs recorded in the ROM.

According to the present embodiment, the ECU 20 functions as an edge extractor 32, a short-distance setting section 36, a candidate filtering section 40, a lane mark candidate determiner 41, and a lane mark recognizer 42. Since the short-distance setting section 36 and the candidate filtering section 40 are used when a process of determining lane mark candidates is carried out, the short-distance setting section 36 and the candidate filtering section 40 may be implemented as functions of the lane mark candidate determiner 41, i.e., may be included as portions of the lane mark candidate determiner 41.

The ECU 20 also is provided with an image memory 30, a lane mark candidate memory 34, and a short-distance memory 38, which serve as memory devices.

The drive assisting apparatus 14 is configured, as the above-described lane mark recognizing apparatus 10, with a steering device 50, a braking device 52, and an accelerating device 54 added thereto. Based on lane marks, which are recognized by the lane mark recognizing apparatus 10, the drive assisting apparatus 14 controls the steering device 50, the braking device 52, and the accelerating device 54 under prescribed conditions, so as to assist the driver of the vehicle 12 in driving the vehicle 12 without deviating from a driving road, i.e., a lane, defined between lane marks, or stated otherwise, in driving the vehicle 12 substantially along the center of the lane.

Figure 2:
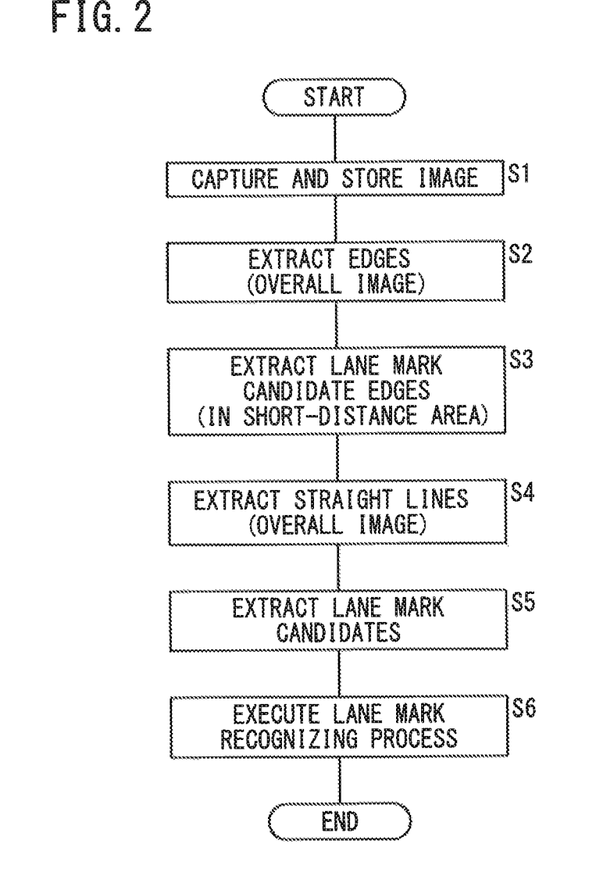
FIG. 2 is a flowchart of an operation sequence of the lane mark recognizing apparatus shown in FIG. 1.

Operations of the lane mark recognizing apparatus 10, which is incorporated in the drive assisting apparatus 14 of the vehicle 12 constructed basically as described above, will be described below with reference to the flowchart shown in FIG. 2.

According to the present embodiment, in step S1, the ECU 20 reads a captured image (a grayscale image, which is a multivalued image) into the image memory 30 each time that an image is captured, as an image in front of the vehicle, by the camera 16 per prescribed time.

In step S2, the edge extractor 32 reads images whose brightness is equal to or greater than a prescribed brightness, i.e., the lightness of which on the road surface is equal to or greater than a prescribed lightness, from the image captured by the camera 16. Then, the edge extractor 32 binarizes the read images, and differentiates the overall image while scanning horizontally, and forwardly if necessary, line by line, thereby extracting edges (image edges) of the overall image.

Also in step S2, the edge extractor 32 reads (and stores) the extracted edges of the overall image as lane mark candidates into the lane mark candidate memory 34.

The edges of the overall image may be converted into plan-view edges as viewed vertically from above (plan-view image edges), and then, the plan-view image edges may be read into the lane mark candidate memory 34. Thereafter, the plan-view image edges may be processed as described below.

Figure 3A:
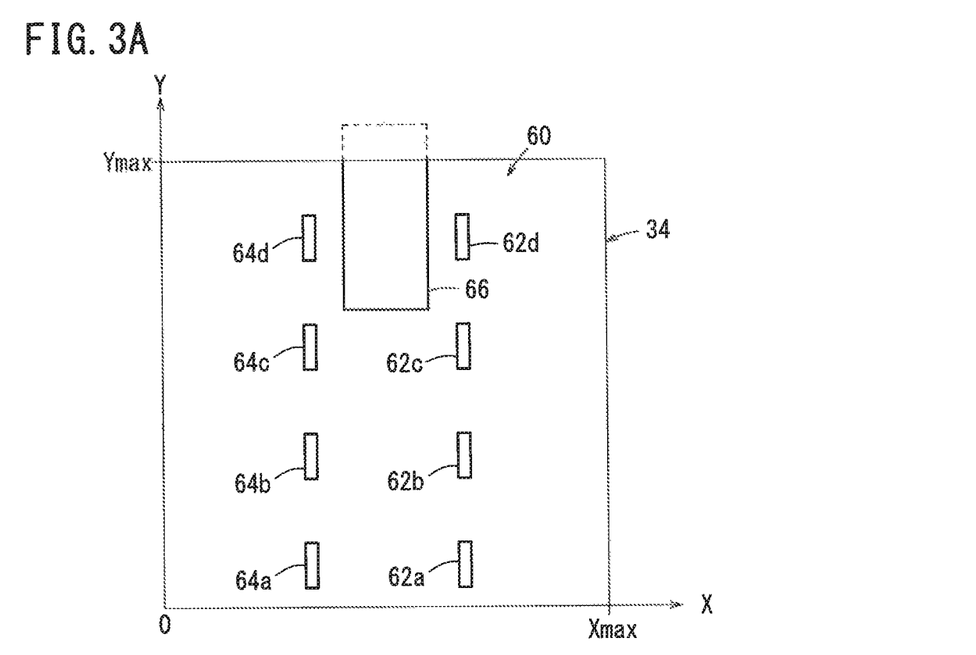
FIG. 3A is a diagram showing an overall image composed of edges extracted from a captured image.

FIG. 3A schematically shows an image 60 (also referred to as an edge image) including edges 62a through 62d, 64a through 64d, 66 as lane mark candidates that have been read into the lane mark candidate memory 34.

When the vehicle is driven on a curved road or the like, a curved image 60 (edges 62a through 62d and 64a through 64d) along the curved road preferably is corrected into a straight image 60 along a simulated road, based on output signals from the yaw rate sensor 24 and/or the steering angle sensor 26. Stated otherwise, the direction of travel of the vehicle preferably is corrected into a Y-axis direction (forward direction), after which the process of determining lane mark candidates is carried out.

Alternatively, the curved image 60 need not necessarily be corrected into a straight image 60 along a simulated road, but the process of determining lane mark candidates may be carried out based on output signals from the yaw rate sensor 24 and/or the steering angle sensor 26.

The lane mark candidate memory 34 comprises a range of pixels from 0 to horizontal Xmax [number of pixels] and vertical Ymax [number of pixels] (total number of pixels=Xmax×Ymax). The horizontal Xmax [number of pixels] generally corresponds to an image over the horizontal width (X-axis width) of the captured image, whereas the vertical Ymax [number of pixels] generally corresponds to an image over the vertical width (Y-axis width) of the captured image. The origin of the camera 16 corresponds to a pixel position defined by Xmax/2 on the X-axis, and to a pixel position defined by 0 on the Y-axis.

In reality, the edge image 60 stored in the lane mark candidate memory 34 includes edges (also referred to as edge images) 62a through 62d and 64a through 64d, which are lane mark candidates that are true lane marks, and an edge 66 (also referred to as an edge image), which is not a lane mark, but a preceding vehicle (other vehicle), although it is handled as a lane mark candidate. Furthermore, although not shown, the edge image 60 also includes edges represented by a large amount of noise, which also are handled as lane mark candidates.

Figure 3B:
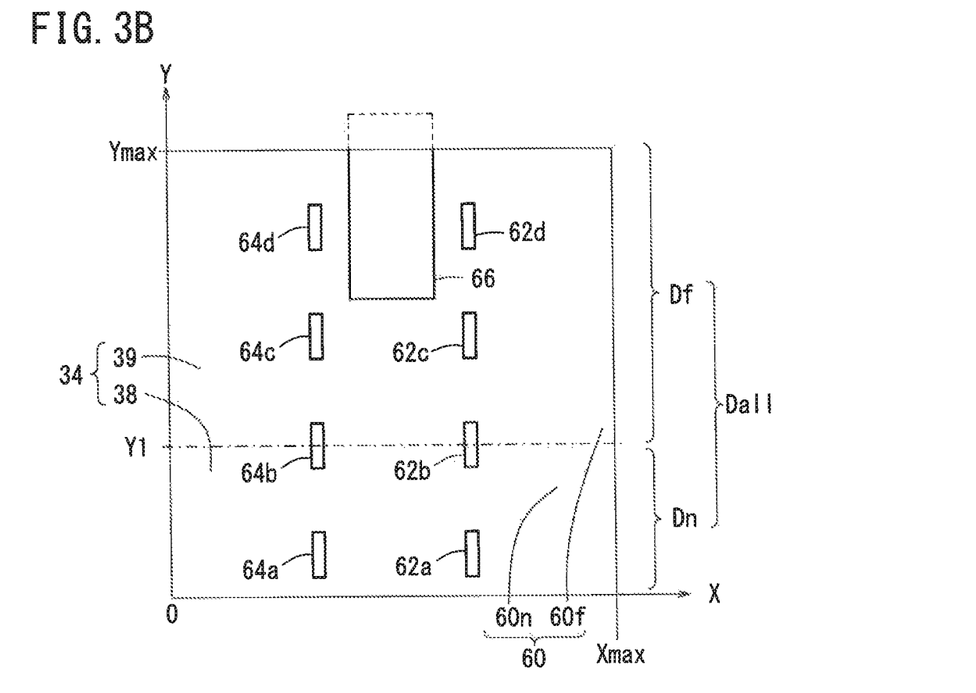
FIG. 3B is a diagram showing the overall image, which is divided into a short-distance area and a long-distance area.

In step S3, in order to extract (detect) edges (lane mark candidate edges) within a short-distance area from the edge image 60, the short-distance setting section 36 (also referred to as a short-distance area image range setting section) sets in the edge image 60, as shown in FIG. 3B, an image range of the short-distance area Dn, depending on the vehicle speed from the speed sensor 22. Further, the short-distance setting section 36 reads an edge image 60n, which represents lane mark candidates included within the set short-distance area Dn, into the short-distance memory 38. On expressways having enforced maximum speeds, the image range of the short-distance area Dn may be set as a fixed area, in view of the fact that the vehicle speed of the vehicle 12 generally remains constant.

According to the present embodiment, from 0 [m] to y1 [m] (y1 [m]=10 [m] to 15 [m]) in front of the vehicle 12, depending on the vehicle speed, the higher the vehicle speed becomes, the shorter the image range (0 through the number of pixels Y1) is set in the short-distance area Dn in the forward direction (Y-axis direction) of the vehicle 12 (the number of pixels Y1 is set to a smaller value). In other words, since the period during which a single image is captured by the camera 16 remains the same, the higher the vehicle speed is, the longer the distance (the distance ymax [m] corresponding to the pixel position Ymax on the Y-axis shown in FIG. 3A) becomes in the forward direction of the vehicle that is covered (shown) by the single image. Consequently, the image range (0 through Y1) within the short-distance area Dn in the forward direction of the vehicle can be set to a smaller value.

In FIG. 3B, Y1 on the Y-axis represents the vertical number of pixels Y1 [pixels] corresponding to the distance y1 [m]. As shown in FIG. 3B, the short-distance memory 38 comprises horizontal Xmax [pixels] by vertical Y1 [pixels] (number of pixels=Xmax×Y1) for reading the edge image 60n as a portion of the image 60.

The edge image 60 is composed of the edge image 60n within the short-distance area Dn, and an edge image 60f within the long-distance area Df, which is positioned in front of the short-distance area Dn. The short-distance area Dn and the long-distance area Df are collectively referred to as a total area Dall.

The lane mark candidate memory 34 is made up of the short-distance memory 38 for reading the edge image 60n within the short-distance area Dn, and a long-distance memory 39 for reading the edge image 60f within the long-distance area Df.

In step S3, for extracting lane mark candidate edges from the edge image 60n within the short-distance area Dn, it is decided whether or not lane mark candidate edges exist within the short-distance area Dn. In order to make such a decision, the candidate filtering section 40 executes a filtering process, with an FIR filter or an IIR filter, on the edge image 60n within the short-distance area Dn over several successive frames.

Figure 4A:
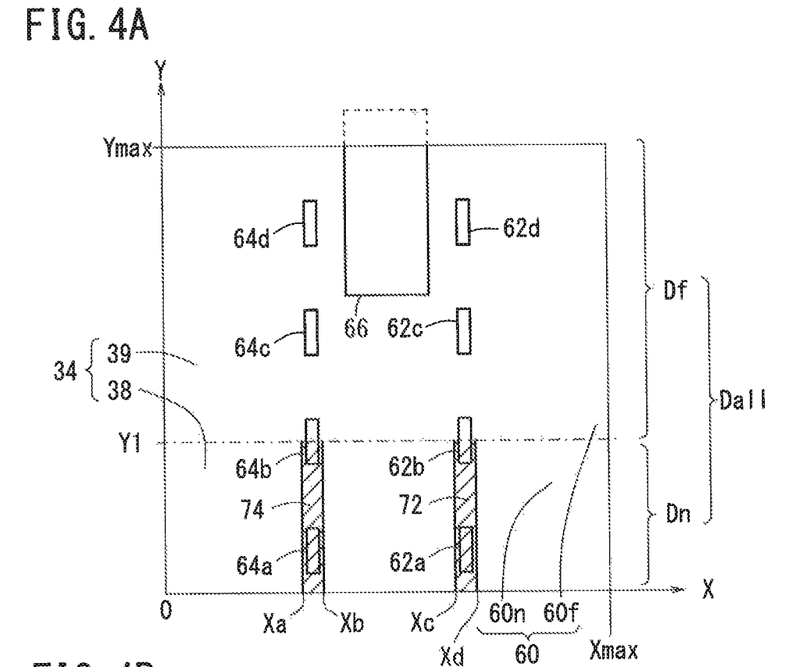
FIG. 4A is a diagram illustrating an edge extracting process in the short-distance area.

If lane mark candidate edges are detected in at least one of the frames and/or if lane mark candidate edges, which have entered into the short-distance area Dn from the long-distance area Df, are detected by the above filtering process, then as shown in FIG. 4A, band-like hatched areas 72, 74 within the short-distance area Dn are extracted as areas in which lane mark candidate edges 62a, 62b, 64a, 64b are determined to exist.

More specifically, as shown in FIG. 4A, in the edge image 60n within the short-distance area Dn, only edges of the band-like hatched areas 72, 74, which lie within a range from pixel positions Xa through Xb and within a range from pixel positions Xc through Xd, are extracted as lane mark candidate edges 62a, 62b, 64a, 64b within the short-distance area Dn. The width of each of the band-like hatched areas 72, 74 along the X-axis direction is greater, by a slight margin, than the width of each of the lane mark candidate edges 62a, 62b, 64a, 64b along the X-axis direction.

In step S4, the lane mark recognizer 42 extracts straight lines by executing a straight line detecting process, such as the aforementioned Hough transform, on the overall edge image 60.

Figure 4B:
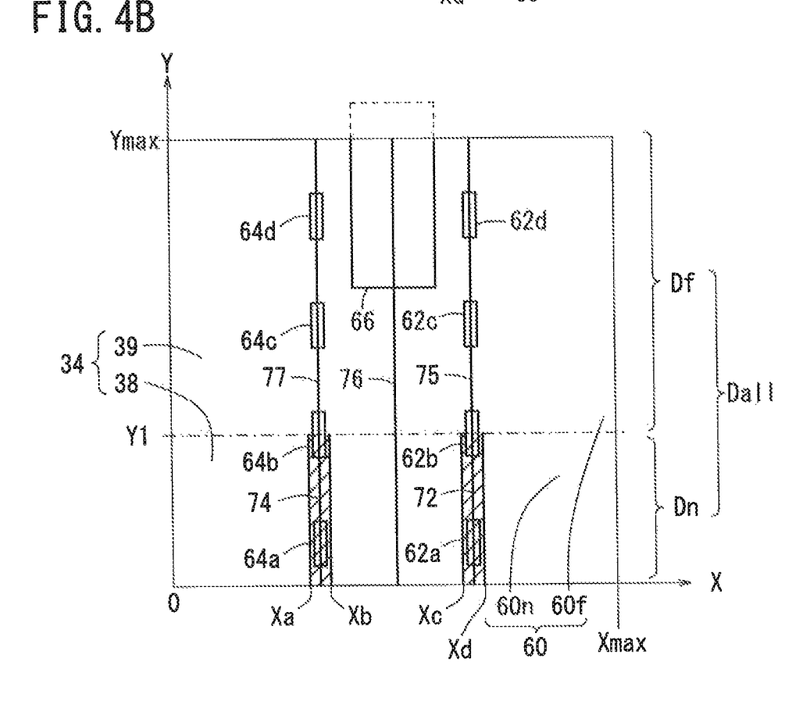
FIG. 4B is a diagram illustrating a process of extracting lane mark candidates.

FIG. 4B shows straight lines 75, 76, 77 that have been detected by the straight line detecting process in step S4.

In step S5, the lane mark candidate determiner 41 extracts, as lane mark candidates, the straight lines 75 and 77, in which the lane mark candidate edges 62a, 62b, 64a, 64b exist within the short-distance area Dn on the straight lines 75, 76, 77 and in the vicinity thereof.

The straight line 76, which is detected based on the edge (edge image) 66 of the preceding vehicle (other vehicle) that remains within the long-distance area Df, is free of lane mark candidate edges that lie within the short-distance area Dn. Therefore, the straight line 76 is not extracted as a lane mark candidate, i.e., the straight line 76 and the edge 66 are regarded as non-lane mark candidates and are excluded.

Figure 5:
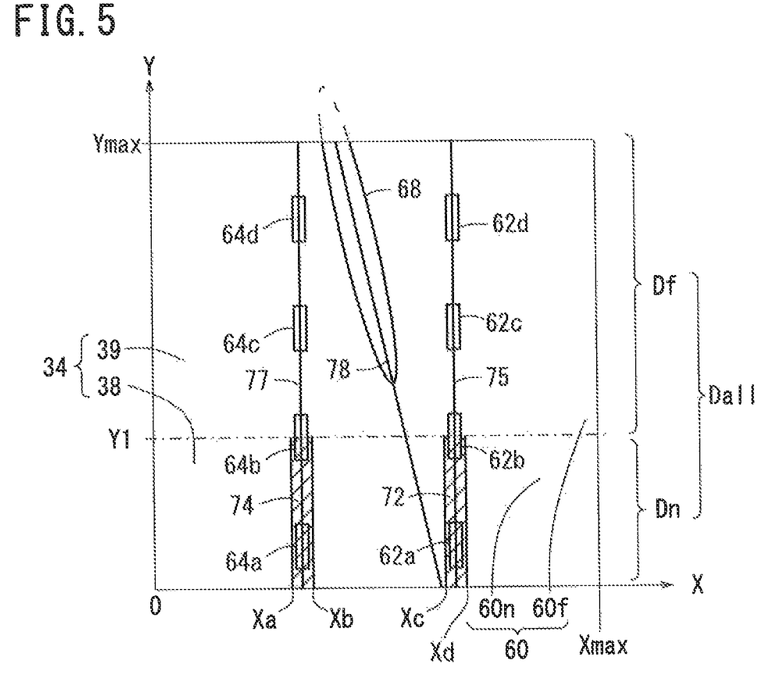
FIG. 5 is a diagram illustrating a process of excluding an edge that represents a reflection.

Likewise, as shown in FIG. 5, since an edge 68, which remains within the long-distance area Df and represents a reflection or the like, is free of lane mark candidate edges within the short-distance area Dn on a straight line 78 generated by the Hough transform and in the vicinity thereof, the straight line 78 and the edge 68 are not extracted as lane mark candidates, i.e., the straight line 78 and the edge 68 are regarded as non-lane mark candidates and are excluded.

In step S6, the lane mark recognizer 42 recognizes the lane mark candidate edges 62a through 62d and 64a through 64d, which lie on the straight lines 75, 77 that are lane mark candidates shown in FIG. 4B and in the vicinity thereof, as lane marks 82, 84 (see FIG. 6) between which the vehicle 12 is actually being driven centrally along the lane.

Figure 6:
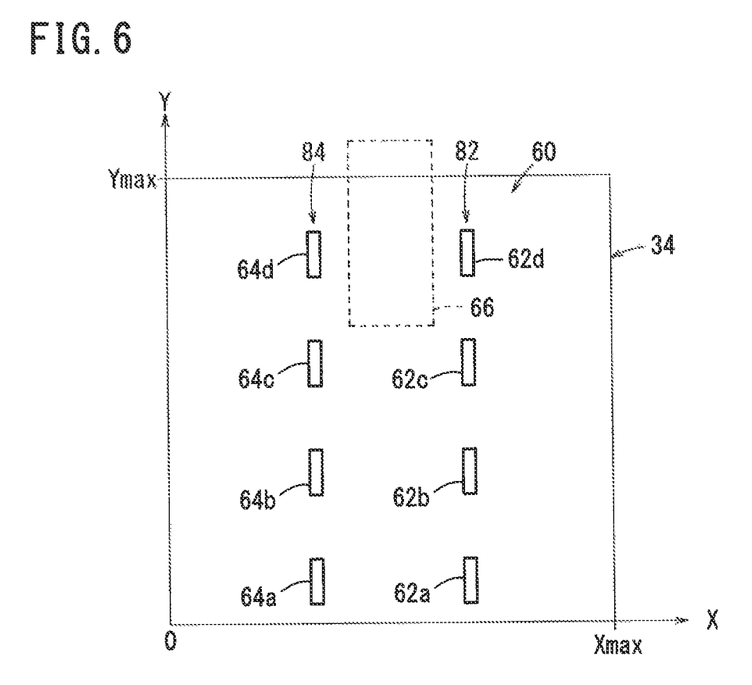
FIG. 6 is a diagram illustrating a lane mark recognizing process.

Based on the lane marks 82, 84, which have been recognized as described above, the drive assisting apparatus 14 controls the steering device 50, etc., in order to assist the driver in driving the vehicle 12 and for preventing the vehicle 12 from deviating from the lane between the lane marks 82, 84. Stated otherwise, the drive assisting apparatus 14 ensures that the vehicle 12 is driven centrally along the lane.

[Overview of the Embodiment]

As described above, the lane mark recognizing apparatus 10 according to the present embodiment is provided with the camera (image capturing unit) 16 mounted on the vehicle 12 for capturing an image including a driving road in front of the vehicle 12, the edge extractor 32 that executes an edge extracting process on the image captured by the camera 16, the lane mark recognizer 42 that recognizes lane marks 82 (edges 62a through 62d), 84 (64a through 64d) based on an edge image (edge) 60 extracted by the edge extractor 32, and the lane mark candidate determiner 41.

According to the present embodiment, as shown in FIG. 4A, the lane mark candidate determiner 41, which essentially includes the short-distance setting section 36 and the candidate filtering section 40, detects edges 62a, 62b, 64a, 64b, which exist within the short-distance area Dn in front of the vehicle 12 of the edge image (edge) 60 that is extracted by the edge extractor 32. In addition, the lane mark candidate determiner 41 determines straight lines 75, 77 and edges 62a through 62d and 64a through 64d as lane mark candidates, based on the detected edges 62a, 62b, 64a, 64b together with edges 62c, 62d, 64c, 64d that exist within the long-distance area Df in front of the vehicle 12 and which are contiguous to the detected edges 62a, 62b, 64a, 64b.

The lane mark recognizer 42 executes a lane mark recognizing process on the straight lines 75, 77 and the edges 62a through 62d and 64a through 64d, which have been determined as lane mark candidates by the lane mark candidate determiner 41, thereby recognizing the lane marks 82, 84.

When the short-distance area Dn is designated, the recognizing process is excluded on the edge 66, which is represented by another vehicle (preceding vehicle) or the like that remains at the same location within the long-distance area Df of the captured image. Therefore, the edge 66, which is represented by another vehicle (preceding vehicle) or the like that remains within the long-distance area Df, is prevented from being erroneously recognized as a lane mark candidate, i.e., is excluded as a non-lane mark candidate. As a result, the other vehicle (preceding vehicle) or the like is not recognized erroneously as a lane mark.

The candidate filtering section 40 of the lane mark candidate determiner 41 can detect, as edges that exist within the short-distance area Dn, edges 62b, 64b (see FIG. 4A) that approach the vehicle 12 in each of prescribed times and enter into the short-distance area Dn from the long-distance area Df in front of the vehicle 12.

If the edges 62a, 62b or the edges 64a, 64b are detected at least once within the short-distance area Dn in front of the vehicle 12 in a plurality of successive images captured by the camera 16, the candidate filtering section 40 of the lane mark candidate determiner 41 can also detect the edges 62a, 62b or the edges 64a, 64b as the edges 62a, 62b or the edges 64a, 64b that exist within the short-distance area Dn.

An area in front of the vehicle 12 can be determined based on the output signals from the yaw rate sensor 24 and/or the steering angle sensor 26.

The lane mark candidate determiner 41 may determine the size of the image range in front of the vehicle, which is set as the short-distance area Dn, such that the image range becomes smaller as the vehicle speed of the vehicle 12 that is detected by the speed sensor 22 increases. This is due to the fact that, when the vehicle speed becomes higher, the edges 62a, 62b and the edges 64a, 64b reliably enter into the image range of the short-distance area Dn, even though the image range (short-distance area Dn) is smaller.

According to the above embodiment, the edge image (edge) 60n (62a, 62b, 64a, 64b), which exists within the short-distance area Dn in front of the vehicle 12, is detected from among the edge image (edge) 60 (62a through 62d, 64a through 64d, 66) extracted by the edge extractor 32. In addition, lane mark candidates are determined based on the detected edge image (edge) 60n (62a, 62b, 64a, 64b) and the contiguous edge image (edge) 60f (62b through 62d, 64b through 64d) in the long-distance area Df, which exists in front of the vehicle 12 farther than the edge image (edge) 60n (62a, 62b, 64a, 64b). However, according to a reverse process, the lane mark candidate determiner 41 may detect the edge image (edge) 60f (62b through 62d, 64b through 64d, 66), which exists within the long-distance area Df in front of the vehicle 12, from among the edge image (edge) 60 (62a through 62d, 66, 64a through 64f) extracted by the edge extractor 32, and then determine straight lines 75, 77 and edge images (edges) 62a through 62d and 64a through 64d as lane mark candidates, on the basis of the detected edge image (edge) 60f and the edge image (edge) 60n (62a, 64a) that exists within the short-distance area Dn, which is closer to the vehicle 12 than the edge image (edge) 60f, and is contiguous to the edge image (edge) 60f (62b through 62d, 64b through 64d). Further, the lane mark recognizer 42 may recognize lane marks 82, 84 by executing a lane mark recognizing process on the straight lines 75, 77 and the edge images (edges) 62a through 62d and 64a through 64d, which have been determined by the lane mark candidate determiner 41.

The present invention is not limited to the above embodiment, but various arrangements may be employed therein based on the disclosure of the above description.

The invention claimed is:

1. A lane mark recognizing apparatus comprising:
   a camera mounted on a vehicle that captures an image including a driving road in front of the vehicle; and
   an electronic control unit including a processor configured to provide:
   an edge extractor that executes an edge extracting process on the image captured by the image capturing unit;
   a lane mark recognizer that recognizes lane marks based on edges extracted by the edge extractor; and
   a lane mark candidate determiner,
   wherein the edge extractor separately extracts, from an entire image, edges within a short-distance area in front of the vehicle and edges within a long-distance area located in front of the short-distance area,
   wherein the lane mark recognizer extracts straight lines based on all the edges extracted from the entire image by the edge extractor,
   wherein the lane mark candidate determiner determines, from among all the straight lines extracted, straight lines derived from both the edges within the short-distance area and the edges within the long-distance area as lane mark candidates, while excluding the straight lines derived only from the edges existing in the long-distance area, and
   wherein the lane mark recognizer recognizes, as lane marks, the edges existing within the short-distance area and the long-distance area and located on or in a vicinity of the candidate straight lines determined by the lane mark candidate determiner.

2. The lane mark recognizing apparatus according to claim 1, wherein the lane mark candidate determiner detects, as the edges that exist within the short-distance area, edges that approach the vehicle in each of prescribed times and enter into the short-distance area from the long-distance area in front of the vehicle.

3. The lane mark recognizing apparatus according to claim 1, wherein, if the edges are detected at least once in the short-distance area in front of the vehicle in a plurality of successive images that are captured by the image capturing unit, the lane mark candidate determiner detects the detected edges as the edges that exist within the short-distance area.

4. The lane mark recognizing apparatus according to claim 1, wherein the vehicle includes a yaw rate sensor for the vehicle and/or a steering angle sensor for a steering wheel; and
   an area in front of the vehicle is determined based on output signals from the yaw rate sensor and/or the steering angle sensor.

5. The lane mark recognizing apparatus according to claim 1, wherein the lane mark candidate determiner is arranged such that, as the vehicle speed of the vehicle becomes higher, an image range within the short-distance area in a forward direction of the vehicle is set shorter.

6. The lane mark recognizing apparatus according to claim 1, wherein an edge, which exists within the long-distance area in front of the vehicle and remains within the long-distance area after a prescribed time, is excluded so as not to be handled as a lane mark candidate.

* * * * *